US012715154B2

(12) United States Patent
Korn et al.

(10) Patent No.: US 12,715,154 B2
(45) Date of Patent: Aug. 25, 2026

(54) MANUAL FOOD SLICING APPARATUS INCLUDING A RETRACTABLE BLADE ASSEMBLY

(71) Applicant: LES PROMOTIONS ATLANTIQUES INC., Longueuil (CA)

(72) Inventors: Eric Korn, Longueuil (CA); Stéphane Béliveau, Longueuil (CA)

(73) Assignee: LES PROMOTIONS ATLANTIQUES INC., Longueuil (CA)

( * ) Notice: Subject to any disclaimer, the term of this patent is extended or adjusted under 35 U.S.C. 154(b) by 169 days.

(21) Appl. No.: 18/594,255

(22) Filed: Mar. 4, 2024

(65) Prior Publication Data

US 2024/0293947 A1 Sep. 5, 2024

Related U.S. Application Data

(60) Provisional application No. 63/487,909, filed on Mar. 2, 2023.

(51) Int. Cl.
*B26D 3/28* (2006.01)
*B26D 3/18* (2006.01)

(52) U.S. Cl.
CPC ............... *B26D 3/283* (2013.01); *B26D 3/18* (2013.01); *B26D 2003/285* (2013.01); *B26D 2003/287* (2013.01); *B26D 2003/288* (2013.01); *B26D 2210/02* (2013.01)

(58) Field of Classification Search
CPC ........ B23D 2003/288; B26D 2003/285; B26D 2003/286; B26D 2003/287; B26D 2003/288; B26D 3/283
USPC ............................................................ 30/162
See application file for complete search history.

(56) References Cited

U.S. PATENT DOCUMENTS

| | | | | |
|---|---|---|---|---|
| 7,191,691 | B2 | 3/2007 | Kaposi | |
| 8,096,218 | B2 * | 1/2012 | Klotz | B26D 3/283 83/DIG. 1 |
| 10,011,031 | B2 | 7/2018 | Hauser et al. | |
| 2012/0006165 | A1 * | 1/2012 | Thornton | B26D 3/283 83/397 |

FOREIGN PATENT DOCUMENTS

| | | | | |
|---|---|---|---|---|
| DE | 102007043294 | A1 * | 3/2009 | A47J 43/25 |

* cited by examiner

*Primary Examiner* — Jennifer S Matthews
(74) *Attorney, Agent, or Firm* — Amster, Rothstein & Ebenstein LLP

(57) ABSTRACT

A manual food slicing apparatus is provided for slicing a food material into food cuts. The apparatus includes a main blade and at least one blade set comprising multiple spaced apart blades being positioned in a row that extends in a transverse direction of a sliding area. The blades are moveable between a cutting position to perform longitudinal cuts in the food material upon sliding the food material against the blade set in a forward displacement direction, and a biased position when the blade set is retracted to avoid cutting the food material when displaced in a rearward displacement. The apparatus can further include a locking mechanism being selectively moveable between a locked position for preventing movement of the blades from the cutting position to the biased position, and an unlocked position for allowing movement of the blades between the cutting position and the biased position.

20 Claims, 12 Drawing Sheets

MANUAL FOOD SLICING APPARATUS INCLUDING A RETRACTABLE BLADE ASSEMBLY

TECHNICAL FIELD

The present invention generally relates to an apparatus for manually slicing food, and more particularly to a manual food slicing apparatus including a main blade and a retractable blade assembly, with the retractable blade assembly being selectively lockable for specific slicing operations.

BACKGROUND

Known manual food slicing apparatus can impose resistance to food material when sliding the food material towards an initial position against blades of the slicing apparatus, forcing a user to lift the handguard of the apparatus and allowing the food material to slip away from a sliding area. Undesired movement of the food material with respect to the sliding area can further cause bruising of the food material upon multiple passes over the sliding area and misaligned additional cuts in the food material when moved back towards the initial position.

There is still a need for a technology that overcomes at least some of the drawbacks of what is known in the field, such as the above-mentioned drawbacks that may result from permanently protruding blades.

SUMMARY

There is proposed herein a manual food slicing apparatus including a main blade and a reversibly retractable blade assembly. The retractable blade assembly comprises at least one blade set comprising multiple spaced apart blades. The multiple blades are configured to extend upwardly from and perpendicularly to a sliding area of the apparatus to perform longitudinal cuts in the food material when displaced along the sliding area. For example, the multiple blades can be further oriented perpendicularly to the main blade. For example, the at least one blade set is a julienne blade set. The main blade extends in parallel relation to the sliding area to slice or grate the food material being displaced along the sliding area. For example, the main blade is a mandoline blade or a grater blade.

It should be noted that the term retractable refers herein to the capacity of the blade set of the blade assembly to be retracted below the sliding area in a biased position, such that the food material can remain uncut when being displaced along the sliding area. In some embodiments, retraction of the blade assembly can include tilting of the blades about a rotation axis being parallel to a transverse direction of the sliding area. Thus, the retractable blade assembly can be referred to as a tiltable blade assembly. However, in some embodiments, retraction of the blade set below the sliding area can include displacing the blades below the sliding area according to at least one of a rotation or a translation movement.

In some embodiments, the mechanism rendering the blade assembly retractable was developed to allow the blades to retract into a biased position in response to the displacement of the food material towards the blades in a rearward displacement direction, and to move back from the biased position into a cutting position in response to the further displacement of the food material away from the blades in the rearward displacement direction. The retractable blade assembly greatly reduces the resistance opposed to the food material when moving the food material rearwardly towards the initial sliding position and maintains the momentum needed for a clean cut. In addition, biasing the blades by retracting prevents creating double longitudinal cuts when food material is misaligned when moved back towards the initial position.

The blade assembly can be retracted into the biased position when a retraction mechanism is actuated upon displacing the food material from the distal portion to the proximal portion of the sliding. The manual food slicing apparatus can include an actuator component that is operatively connected to the retraction mechanism in order to actuate the retraction mechanism and allow movement of the blades between the cutting position and the biased position. The actuator component is triggered when the food material is displaced from the distal portion of the sliding area towards the blades, thereby causing the blades to move from the cutting position to the biased position. The actuator component is then released when the food material is further displaced away from the blades to the proximal portion of the sliding area, thereby causing the blades to move from the biased position to the cutting position.

In some embodiments, the mechanism rendering the blade assembly tiltable was developed to allow the blades to tilt rearwardly into a biased position when food material is pushed against the blades in a rearward displacement direction, and to tilt forwardly back from a biased position into a cutting position when pressure from the food material is released. The tiltable blade assembly greatly reduces the resistance opposed to the food material when moving the food material towards the initial sliding position and maintains the momentum needed for a clean cut. In addition, biasing the blades by tilting prevents creating double longitudinal cuts when food material is misaligned when moved back towards the initial sliding position.

The following aspects are disclosed herein.

1. A manual food slicing apparatus for slicing a food material and produce food cuts, the apparatus comprising:

a frame defining a sliding area having at least one aperture, the sliding area being configured for receiving the food material when abutted to and pressured against the sliding area;

a main blade being mounted about the frame and extending in parallel relation to the sliding area to slice the food material being displaced in a forward displacement direction along the sliding area;

a blade assembly being mounted about the frame and positioned upstream of the main blade in a longitudinal direction of the sliding area, the blade assembly comprising a blade set comprising multiple spaced apart blades being positioned in a row that extends in a transverse direction of the sliding area;

a retraction mechanism being operatively connected to the blade assembly and being actuable to cause movement of the blade assembly in response to the displacement of the food material in a rearward displacement direction, wherein the blade assembly is moveable between:

a cutting position wherein the blade set extends upwardly from the sliding area and through the at least one aperture of the frame to perform longitudinal cuts in the food material upon sliding the food material against the blade set in the forward displacement direction of the sliding area, and a biased position when the blade set is retracted below the sliding area and through the at least one aperture to avoid cutting the food material upon sliding the food material in the rearward displacement direction of the sliding area; and a locking mechanism being operatively connected to the retraction mechanism, wherein the locking mechanism is selectively moveable between:

a locked position where the locking mechanism prevents actuation of the retraction mechanism, thereby preventing movement of the blade assembly from the cutting position to the biased position, and an unlocked position where the locking mechanism allows actuation of the retraction mechanism, thereby allowing movement of the blade assembly between the cutting position and the biased position;

wherein the blade assembly is configured to automatically move back from the biased position to the cutting position when the retraction mechanism is released.

2. The apparatus of aspect 1, wherein the retraction mechanism comprises a spring, and the blade assembly is configured to move back from the biased position to the cutting position under the action of the spring.

3. The apparatus of aspect 1 or 2, wherein the retraction mechanism is configured to force the retraction of the blade set below the sliding area by tilting the blade set about a rotation axis being parallel to the transverse direction of the sliding area between the cutting position and the biased position.

4. The apparatus of any one of aspects 1 to 3, wherein the retraction mechanism further includes a barrel onto which are secured the blades of the blade set, and a shaft that is inserted through the barrel and that is mounted at each end thereof to the frame, with the barrel being partially rotatable with respect to the shaft to allow the blades to tilt between the cutting position and the biased position.

5. The apparatus of aspect 4, wherein the shaft is rotatably mounted with respect to the frame to allow the blade set to be locked below the sliding area and away from the at least one aperture.

6. The apparatus of any one of aspects 1 to 5, wherein the blade set is a first blade set and the blade assembly comprises a plurality of blade sets having different blade spacing, and wherein the blade assembly further comprises a blade selection knob that is actuable to position one blade set of the plurality of blade sets into the cutting position.

7. The apparatus of any one of aspects 1 to 6, wherein each blade of the blade set is a pointed triangular blade having a front edge facing a proximal portion of the sliding area and a rear edge facing a distal portion of the sliding area to cut the food material when displaced in both forward and rearward displacement directions.

8. The apparatus of any one of aspects 1 to 7, wherein the frame comprises a sliding platform and a levelling assembly, with the levelling assembly being actuable to vary a distance between the sliding platform and the main blade of the apparatus, thereby varying a thickness of the food cuts.

9. The apparatus of any one of aspects 1 to 8, further comprising a main blade assembly, the main blade assembly comprising the main blade and a secondary frame to which is mounted the main blade, wherein the secondary frame is positioned at a certain height with respect to the frame so as to define a gap between the main blade and the frame.

10. The apparatus of aspect 9, wherein the main blade assembly is removable from the frame so as to be replaced by another main blade assembly including another main blade having a different cutting profile.

11. The apparatus of any one of aspects 1 to 10, wherein the frame comprises a pair of spaced apart edge walls extending upwardly from the frame and in parallel relation to the longitudinal displacement direction on each side of the sliding area.

12. The apparatus of aspect 11, further comprising a free pusher that is configured to cooperate with the frame for maintaining the food material abutted to and pressured against the sliding area when displaced along the sliding area, the pusher comprising:

a main body including an open cavity that is sized and shaped to contain the food material during slicing thereof; and a circular rib extending downwardly from a peripheral surface of the distal end of the main body, the circular rib being configured to slide along the edge walls of the frame to maintain the pusher in the sliding area and to allow rotation of the pusher with respect to the frame.

13. The apparatus of aspect 12, wherein the pusher further includes a hand guard extending outwardly and further upwardly from the distal end of the main body to define a recess for nesting fingertips of a user.

14. The apparatus of any one of aspects 1 to 13, further comprising a foldable leg component that is pivotably connected to the frame.

15. The apparatus of any one of aspects 1 to 14, comprising an actuator component that is positioned along the sliding area and that is operatively connected to the retraction mechanism, in order to actuate the retraction mechanism and allow movement of the blades between the cutting position and the biased position when the actuator component is triggered by the displacement of the food material along the sliding area.

16. The apparatus of aspect 15, wherein the actuator component is a lever or a button positioned on the frame along the sliding area.

17. The apparatus of aspect 15, wherein the actuator component comprises or consists of the blade set.

18. A manual food slicing apparatus for slicing a food material and produce food cuts, the apparatus comprising:

a frame defining a sliding area having at least one aperture, the sliding area being configured for receiving the food material when abutted to and pressured against the sliding area;

a main blade being mounted about the frame and extending in parallel relation to the sliding area to slice the food material being displaced along the sliding area;

a blade assembly being mounted about the frame and positioned upstream of the main blade in a longitudinal direction of the sliding area, the blade assembly comprising a blade set comprising multiple spaced apart blades being positioned in a row that extends in a transverse direction of the sliding area; and a retraction mechanism being operatively connected to the blade assembly and being actuable to cause tilting of the blade assembly in response to the displacement of the food material in a rearward displacement direction, wherein the blade assembly is tiltable between:

a cutting position wherein the blade set extends upwardly from the sliding area and through the at least one aperture of the frame to perform longitudinal cuts in the food material upon sliding the food material against the blade set in a forward displacement direction of the sliding area, and a biased position when the blade set is tilted below the sliding area and through the at least one aperture to avoid cutting the food material upon sliding the food material towards the blade set in the rearward displacement direction of the sliding area;

wherein the blade assembly is configured to automatically tilt back from the biased position to the cutting position when the retraction mechanism is released.

19. The apparatus of aspect 18, further comprising a locking mechanism being operatively connected to the retraction mechanism, wherein the locking mechanism is selectively moveable between:

a locked position where the locking mechanism prevents actuation of the retraction mechanism, thereby preventing tilting of the blade assembly from the cutting position to the biased position, and an unlocked position where the locking mechanism allows actuation of the retraction mechanism, thereby allowing tilting of the blade assembly between the cutting position and the biased position.

20. The apparatus of aspect 18 or 19, further comprising at least one feature as defined in any one of aspects 2 to 17.

21. A food slicing apparatus assembly comprising the apparatus as defined in any one of aspects 1 to 20, and a blade container that is securable to the frame of the apparatus.

22. A method for slicing a food material using the apparatus as defined in any one of claims 1 to 17, the method comprising performing at least one of:

a julienne slicing sequence comprising the steps of:

positioning the locking mechanism in the unlocked position, displacing the food material in the forward displacement direction from the proximal portion of the sliding area to the distal portion of the sliding area to perform longitudinal cuts in the food material upon passing the blade assembly in the cutting position and to further perform a cross-sectional cut in the food material upon passing the main blade, thereby producing the food cuts in a julienne fashion and a remaining unsliced food material, and displacing the remaining unsliced food material in the rearward displacement direction from the distal portion of the sliding area to the proximal portion of the sliding area to retract the blade set into the frame from the cutting position into the biased position in response to the displacement of the food material, thereby preventing any cut into the remaining unsliced food material; and a cube slicing sequence comprising the steps of:

positioning the locking mechanism in the locked position to prevent the blade assembly to move from the cutting position into the biased position, displacing the food material in the rearward displacement direction from the distal portion of the sliding area to the proximal portion of the sliding area to perform a first set of longitudinal cuts in the food material upon passing the blade assembly in the cutting position and produce a partially cut food material, when at the proximal portion of the sliding area, rotating the partially cut food material at a 90° angle to position the first set of longitudinal cuts in a transverse direction of the sliding area, displacing the partially cut food material in the forward displacement direction from the proximal portion of the sliding area to the distal portion of the sliding area to perform a second set of longitudinal cuts in the partially cut food material upon passing the blade assembly in the cutting position and to further perform a cross-sectional cut in the partially cut food material upon passing the main blade, thereby producing food material cubes and the remaining unsliced food material.

23. The method of aspect 22, wherein the cube slicing sequence further comprising rotating the remaining unsliced food material at a 90° angle at the distal portion of the sliding area.

24. The method of aspect 22 or 23, comprising repeating at least one of the julienne slicing sequence, and the cube slicing sequence.

25. The method of any one of aspects 22 to 24, comprising using the pusher to secure the food material when displacing and/or rotating the food material along the sliding area.

While the invention will be described in conjunction with example embodiments, it will be understood that it is not intended to limit the scope of the invention to such embodiments. On the contrary, it is intended to cover all alternatives, modifications and equivalents as may be included as defined by the present description. The objects, advantages and other features of the present invention will become more apparent and be better understood upon reading of the following non-restrictive description of the invention, given with reference to the accompanying drawings.

BRIEF DESCRIPTION OF THE DRAWINGS

Implementations of the manual food slicing apparatus and related reversibly tiltable blade assembly are represented in and will be further understood in connection with the following figures.

DETAILED DESCRIPTION

There is proposed herein a manual food slicing apparatus including a frame defining a sliding area being configured for receiving a food material to be sliced, a main blade and a retractable blade assembly, both being mounted to the frame. The retractable blade assembly includes multiple spaced apart blades that can be retracted into the frame so as to avoid cutting of the food material by the blade assembly when the food material is sled along the sliding area of the frame.

In some embodiments, the mechanism rendering the blade assembly retractable was developed to allow the blades to retract into a biased position in response to the displacement of the food material from a distal portion of the sliding area towards the blades, and to move back from the biased position into a cutting position in response to the further displacement of the food material away from the blades to a proximal portion of the sliding area. The movement of the blades between the cutting position and the biased is said to be in response to the displacement of the food material from the distal portion of the sliding area to the proximal portion of the sliding area. It should be understood that the displacement of the food material can cause direct or indirect actuation of the blades of the blade assembly. The blade assembly can be retracted into the biased position when a retraction mechanism is actuated upon displacing the food material from the distal portion to the proximal portion of the sliding. The blade assembly is configured to automatically move back from the biased position to the cutting position when the retraction mechanism is released in response to the displacement of the food material away from the blades to the proximal portion of the sliding area.

The manual food slicing apparatus can include an actuator component that is operatively connected to the retraction mechanism in order to actuate the retraction mechanism and allow movement of the blades between the cutting position and the biased position. The actuator component is triggered when the food material is displaced from the distal portion of the sliding area towards the blades, thereby causing the blades to move from the cutting position to the biased position. The actuator component is then released when the food material is further displaced away from the blades to the proximal portion of the sliding area, thereby causing the blades to move from the biased position to the cutting position.

Figure 13:
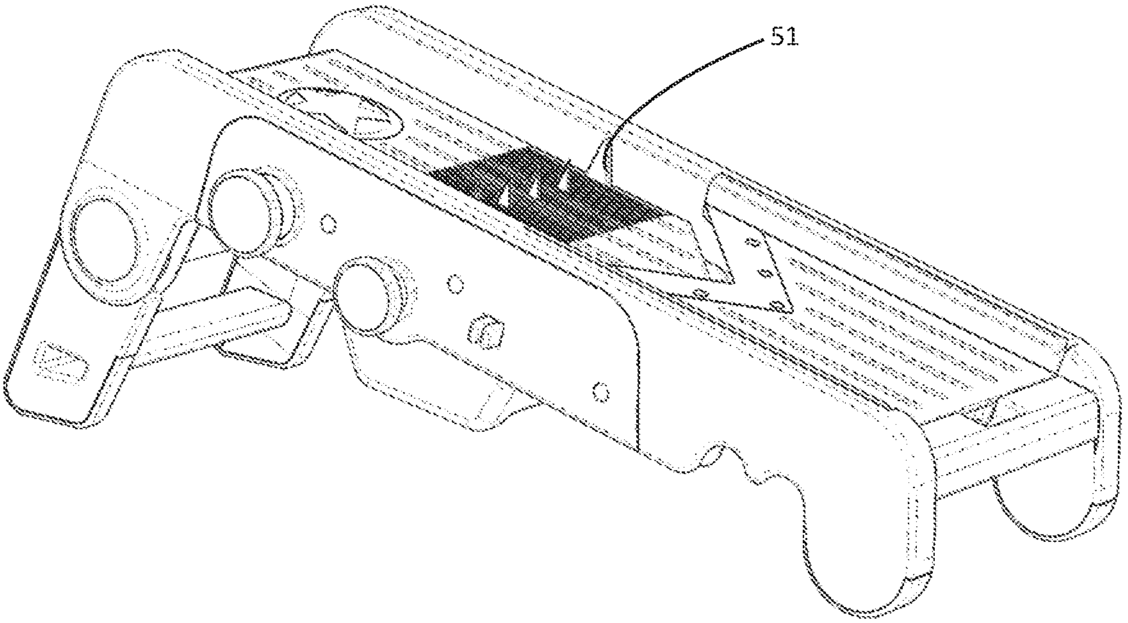
FIG. 13 is a top elevational view of the manual food slicing apparatus including the apparatus according to another embodiment including a lever as an actuator component of the retraction mechanism.

In some embodiments, the actuator component is positioned along the sliding area and is configured to cause movement of the blades between the cutting position and the biased position when the actuator component is triggered by the displacement of the food material along the sliding area. For example, the actuator component can be a lever or a button positioned aside and along the sliding area (e.g., on the frame), with the lever or button being triggered/pushed by the food material or a pusher that is used to displace the food material along the sliding area. FIG. 13 shows an embodiment of the manual food slicing apparatus wherein the actuator component is a lever 51.

In other embodiments, the blades act as the actuator component of the retraction mechanism, the latter being thus actuated when the food material is pushed against the blades upon being displaced from the distal portion to the proximal portion of the sliding area, thereby retracting the blades from the cutting position to the biased position. Further details are provided regarding the embodiments wherein the blades are the actuator component, including the embodiment shown in the Figures.

In the shown embodiment, it is noted that the retractable blade assembly is configured to allow retraction of the blades upon being pushed by the food material, when the food material is displaced from a distal portion of the sliding area to a proximal portion of the sliding area. The retractable blade assembly is further configured to maintain the blades protruding from the frame upon being pushed by the food material, when the food material is displaced from the proximal portion of the sliding area to the distal portion of the sliding area. The retractable blade assembly can be further selectively locked to avoid retraction of the blades during specific cutting operations, such as cubing.

Figure 1:
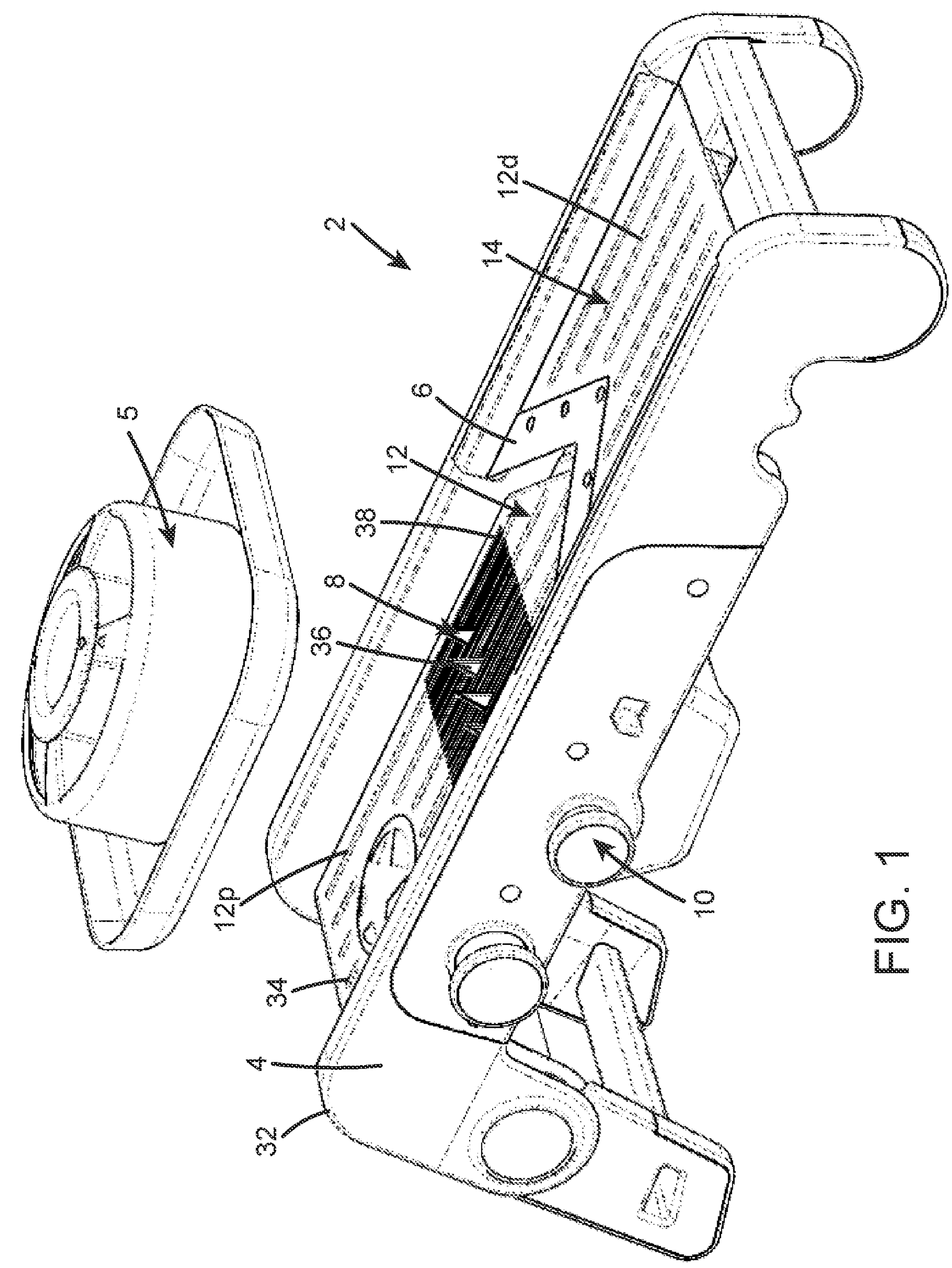
FIG. 1 is a top elevational view of the manual food slicing apparatus including a pusher and a slicing assembly, showing the slicing assembly including a leg component being in an open position, and the pusher being apart from the slicing assembly.

FIG. 1 is a top perspective view of an embodiment of the manual food slicing apparatus 2, showing the frame 4 of the apparatus 2 to which is securable the main blade 6 and from which protrudes a blade set 8 comprising the multiple blades of the retractable blade assembly 10. Food material can be abutted to and pressured against the frame 4 via a pusher 5 that is further slidable in a longitudinal displacement direction (also referred to as a longitudinal direction) to move the sandwiched food material along the sliding area 12 of the frame. It should be noted that the longitudinal displacement direction is to be taken in parallel relation to a length of the frame 4, and more particularly to a length of the sliding area 12 of the frame. The longitudinal displacement direction can be particularly referred to as a forward displacement direction when the food material is moved from the proximal portion 12*p* of the sliding area towards the main blade to the distal portion 12*d* of the sliding area (also referred to as a downward displacement direction as a user might incline the apparatus upon use thereof). The longitudinal displacement direction can further be particularly referred to as a rearward/backward displacement direction when the food material is moved from the distal portion 12*d* of the frame towards the tiltable blade assembly (and more particularly, towards the blade set protruding from the frame) to the proximal portion 12*p* of the sliding area (also referred to as an upward displacement direction as a user might incline the apparatus upon use thereof). When referring to the longitudinal displacement direction, it is noted that downward and forward can be interchangeably used, and that upward and backward (or rearward) can be interchangeably used.

It should be noted that the shown embodiment in FIGS. 1 to 5 is an embodiment where the main blade 6 is a mandoline blade and wherein the at least one blade set 8 is a julienne blade set including regularly spaced apart julienne blades extending perpendicularly to the sliding area 12 and to the mandoline blade 6. However, one will readily understand that other types of blades can be used in place of the mandoline blade 6 or the julienne blade set 8 in combination with the retraction and adjustment mechanism described herein. For example, the spacing between the blades of the blade set 8 could be reduced to perform shredding of the food material rather than producing a julienne of the food material.

Main Blade

FIGS. 1 to 5 illustrate an embodiment of the apparatus wherein the main blade 6 is a main mandoline blade and more particularly, a planar V-shaped blade. It should be noted that the blade 6 can have various other cutting profiles, including at least one of a simple planar blade, a crinkled V-shaped, coarse grating, and fine grating. In the shown embodiment, and more particularly referring to FIGS. 1 and 5, the main blade 6 is provided mounted to a removable main blade assembly 14 that is removably securable to a distal recess 16 defined in the frame 4 and rearward from the tiltable blade assembly 10 along the longitudinal displacement direction. The main blade assembly 14 includes a secondary frame 18 to which is mounted the main blade 6. The main blade assembly 14 is stationary and the secondary frame can be positioned at a certain height with respect to the frame 4 so as to define a gap between the main blade 6 and the frame 4. The main blade 6 can be referred to as a stationary blade or stationary main blade. The distance between the main blade 6 and the frame 4 defines a thickness of the slices of food material that are produced when moving the food material in a downward displacement direction against the main blade 6. The secondary frame 18 defines the distal portion 12*p* of the sliding area of the slicing apparatus 2, where the remaining food material finishes its pass in the downward displacement direction and can further start a new pass in the upward displacement direction.

In some implementations, the distance between the main blade 6 and the frame 4 can be manually adjusted to vary a thickness of the food material slices that are produced by the mandoline blade 6. In the shown embodiment, referring to FIGS. 1 and 5, this adjustment can be performed by varying a position/level of a sliding platform 34 of the frame 4. The sliding platform 34 can be selectively raised or lowered upon actuation of a levelling assembly 20, while the main blade assembly 14 remains stationary with respect to the frame 4. Advantageously, the secondary frame 18 of the main blade assembly 14 can be positioned below the sliding platform 34, thereby preventing the food material from being sliced by the main mandoline blade and securely storing the apparatus 2.

Figure 5:
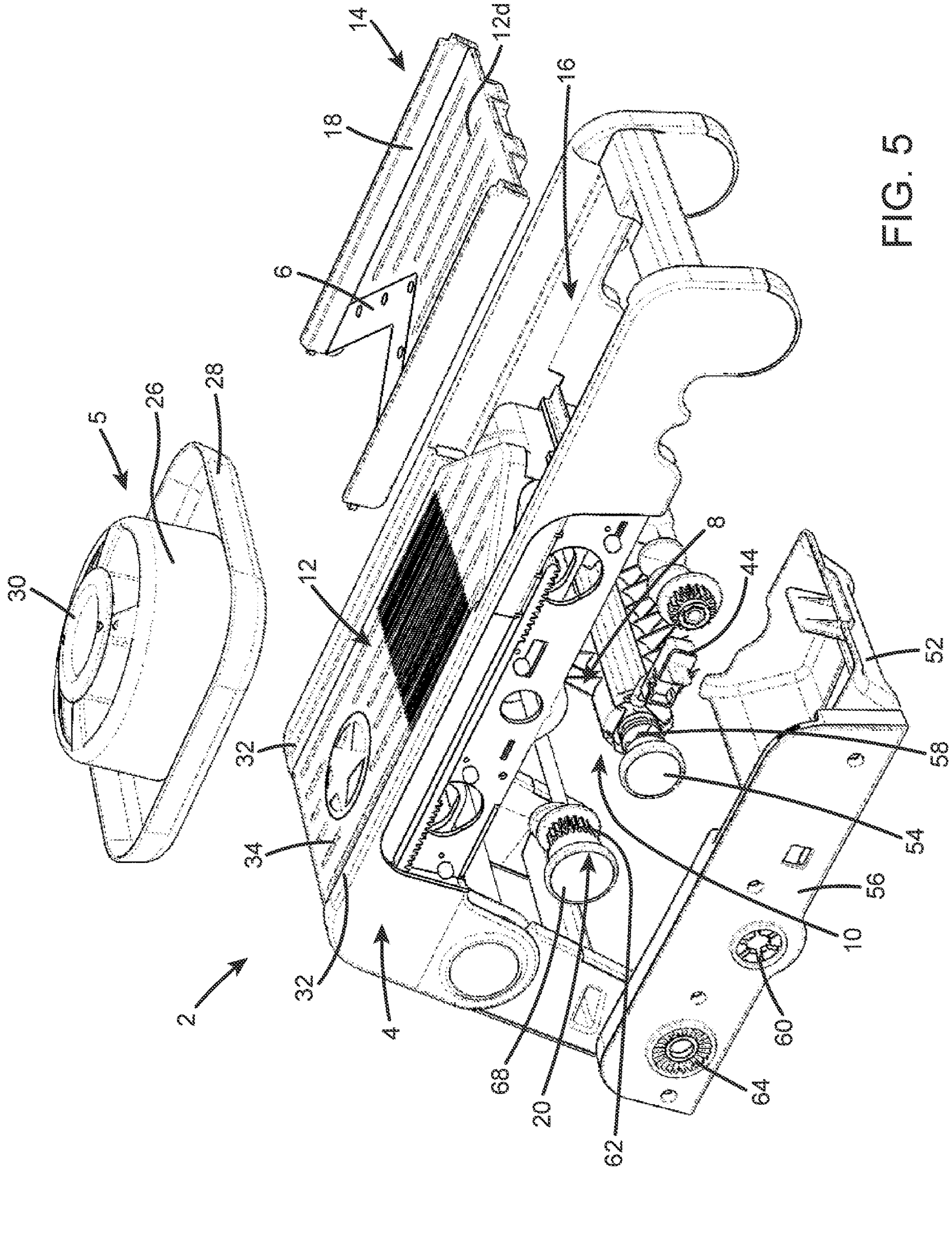
FIG. 5 is a top exploded elevational view of the manual food slicing apparatus according to the embodiment of FIG. 1 with the leg component of the slicing assembly being in the open position.

In the shown embodiment, still referring to FIG. 5, the main blade assembly 14 can be removed from the frame 4 to be replaced with another blade assembly including a main blade having a different cutting profile to perform tailored slicing operations. The present apparatus thus provides multiple slicing options by easily interchanging the available main blade assemblies being removable from the frame for interchanging the main blade. Reversible securing of the main blade assembly 14 into the recess 16 of the frame 4 can be ensured, for example, via a snap-fit connection/joint.

Retractable Blade Assembly

The present slicing apparatus is further able to provide julienne and cube slicing options via selective use of the retractable blade assembly during the slicing operations. In the shown embodiment, referring to FIG. 7, the retractable blade assembly 10 includes a blade set 8 consisting of multiple blades 36 being regularly spaced apart from one another. In the shown embodiment, the blade set 8 is a julienne blade set. It should be noted that julienne slicing or julienning upon use of the retractable blade assembly encompass producing strips of the food material via longitudinal cuts. Depending on the spacing between blades of the retractable blade assembly, thinner or larger strips can be produced without departing from the scope of the present invention.

It should be noted that the term retractable refers herein to the capacity of the blade set of the blade assembly to be retracted within the frame and below the sliding area of the frame in a biased position in response to the displacement of the food material along the sliding area), such that the food material can remain uncut when being displaced along the sliding area in the rearward displacement direction. In some embodiments, including the embodiment shown in FIGS. 1 to 8, retraction of the blades can include tilting the blades according to a partial rotation of the blade set about a rotation axis (being parallel to a transverse direction of the sliding area, i.e., along a width of the frame), thereby causing inclination of the blades towards the frame and through at least one aperture of the frame below the sliding area. Thus, the retractable blade assembly can thus be referred to as a tiltable blade assembly.

However, although not illustrated in the Figures, in some embodiments, retraction of the blade set below the sliding area can include displacing the blades below the sliding area according to a translation movement.

In the shown embodiment, referring to FIG. 1, the tiltable blade assembly 10 is mounted to the frame 4 below the sliding area and the frame 4 thus includes at least one aperture to let the blades 36 from the blade set 8 extend through and above the sliding area. More particularly, in the shown embodiment, the at least one aperture of the sliding area includes multiple parallel slots 38, each slot defining an aperture for a corresponding blade 36 of the blade set 8. A width of each slot 38 is sufficient to let the corresponding blade 36 go through the slot. A length of each slot 38 is sufficient to allow the corresponding blade 36 to tilt back below the sliding area and through the slot 38. The length of each slot 38 is also sufficient to allow rotation of the tiltable blade assembly to change the blade set that is protruding from the sliding area through the slots. In addition, the spacing between two adjacent slots is tailored to selectively allow the blade sets of the tiltable blade assembly to be raised above the sliding area via a corresponding set of slots.

Referring to FIG. 1, the two opposed edges of each blade 36 of the blade set 8 are both tapered to define a pointed triangular blade 36 that can cut food material when displaced in the longitudinal displacement direction. It is noted that a rear edge of the blades 36 of the blade set 8 is the edge of the blades that is encountered by the food material when the food material is displaced along the sliding area in the rearward displacement direction. The rear edge of the blades 36 of the blade set 8 is thus the edge facing the distal portion 12*d* of the sliding area. It is also noted that a front edge of the blades 36 is the edge of the blades that is encountered by the food material when the food material is displaced along the sliding area in the forward displacement direction. The front edge of the blades 36 is thus the edge facing the proximal portion 12*p* of the sliding area.

It should be understood that the blades of the at least one blade set are not limited to triangular pointed blades and any blade readily known in the field can be used in the blade assembly as long as the blade has two cutting edges including a front cutting edge and a rear cutting edge.

Advantageously, when the pressure exerted by the food material or pusher onto the actuator component (e.g. blades or lever) of the retraction mechanism is released, the blade set is released and automatically moves back from the biased position into a cutting position. Release of the pressure exerted onto the actuator component of the retraction mechanism is the result of the food material being displaced away from the blade set along the sliding area. In the present context, the automatic return of the blade assembly into the cutting position (when unlocked) is to be understood as the blade assembly freely returning back to the cutting position without any manual intervention of a user. For example, in the embodiment shown in the Figures, the blade set can be automatically tilted back into the cutting position via a spring action as soon as pressure is released from the rear edge of the blade set.

Figure 4:
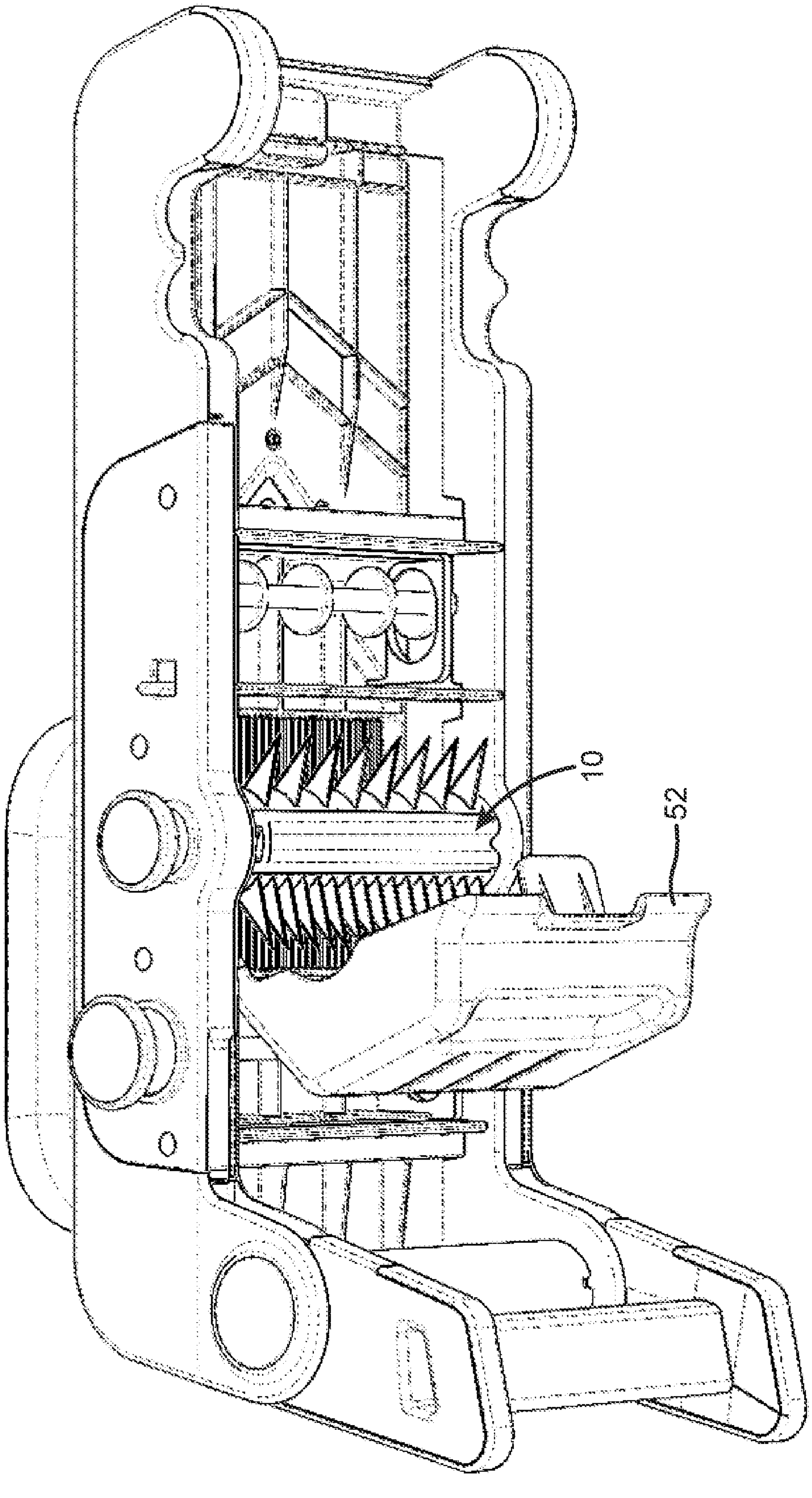
FIG. 4 is a bottom elevational view of the manual food slicing apparatus according to the embodiment of FIG. 1, showing two blade sets of the tiltable blade assembly when a security cover is in an open position.
Figure 6:
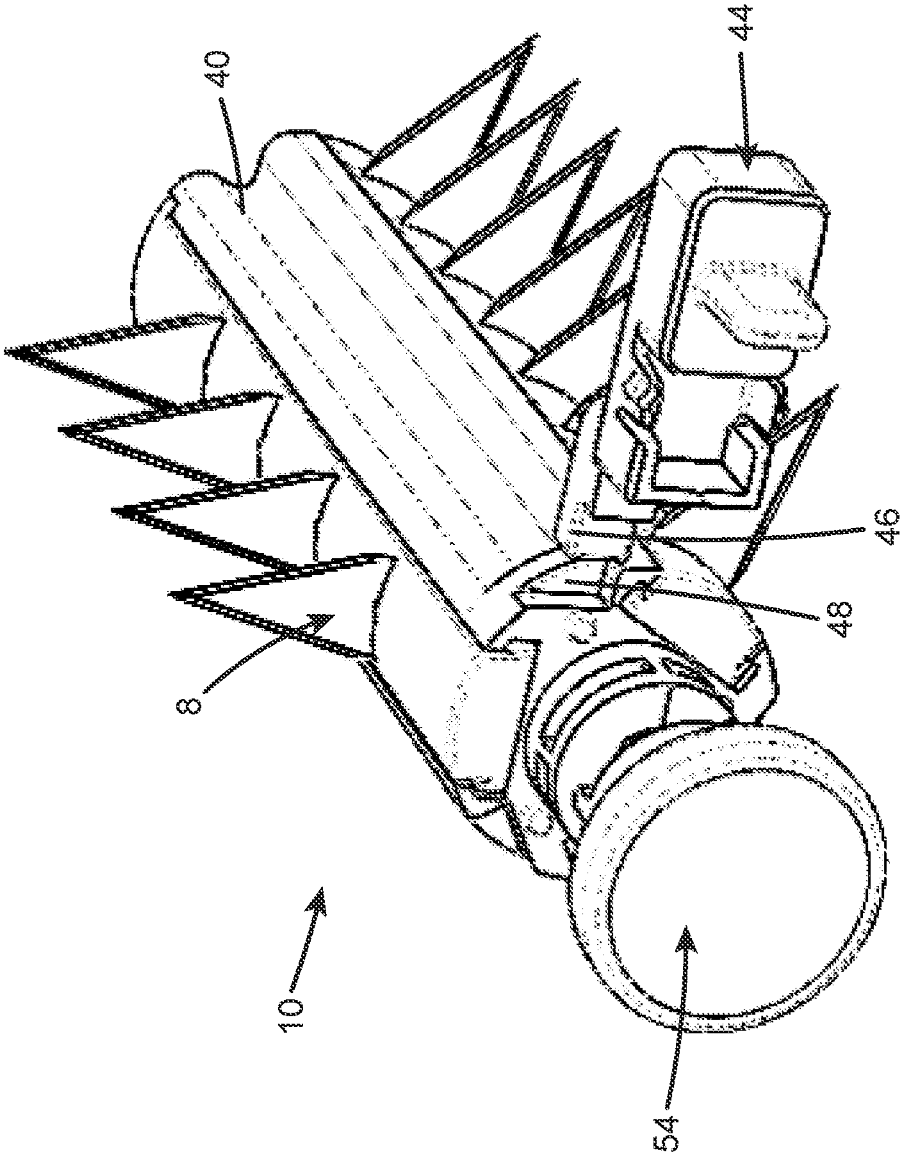
FIG. 6 is a top elevational view of the tiltable blade assembly and a locking slider of the manual food slicing apparatus according to the embodiment of FIG. 1, showing the locking slider in an unlocked position allowing reversible tilting of the tiltable blade assembly.
Figure 7:
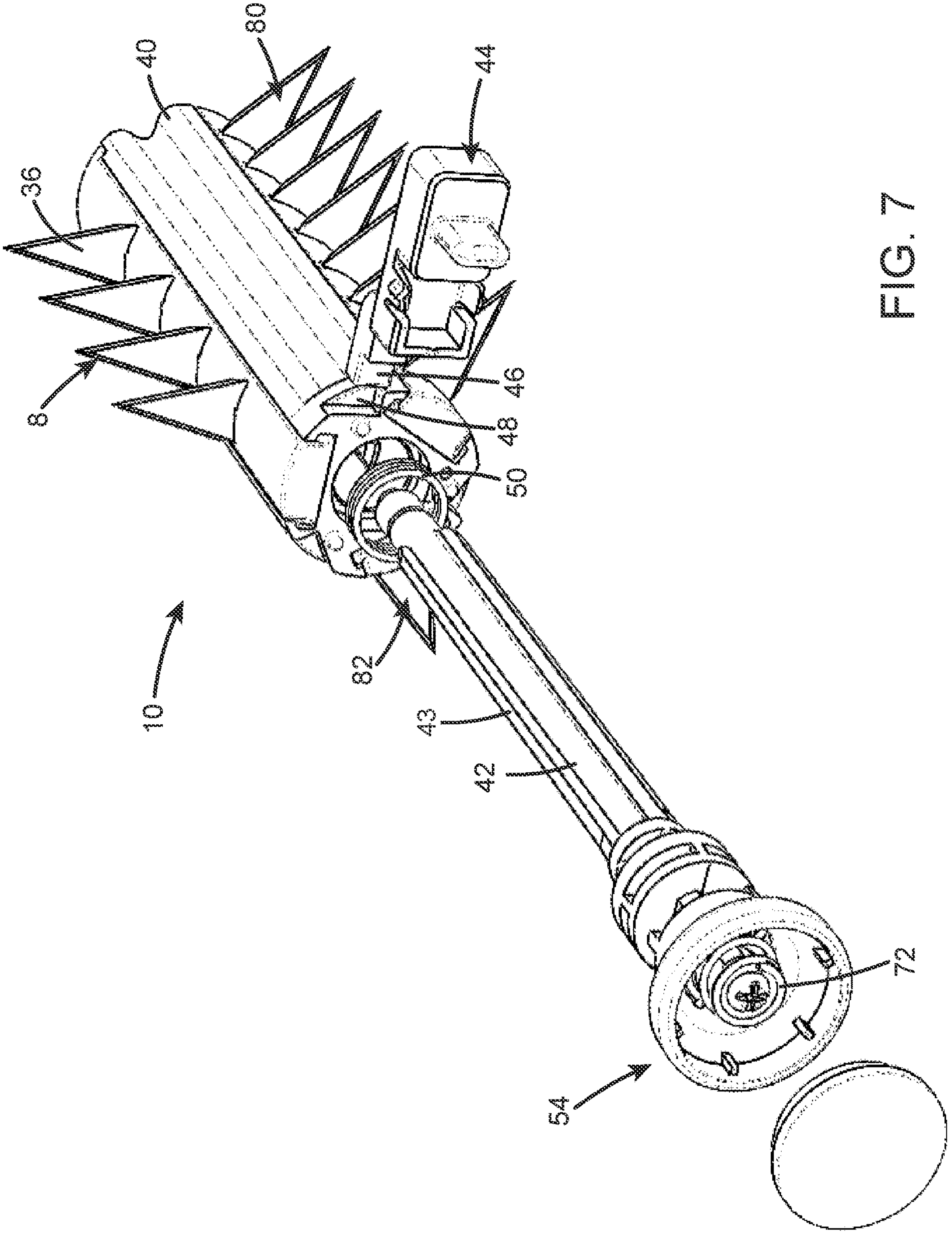
FIG. 7 is a top exploded elevational view of the tiltable blade assembly and the locking slider of FIG. 6, showing a torsion spring allowing the reversible tilting of the tiltable blade assembly when the locking slider in the unlocked position.

In the shown embodiment, referring to FIGS. 6 and 7, the blade assembly includes a retraction mechanism comprising an elongated body 40 that can pivot or at least partially rotate with respect to an axis being parallel to the transverse direction of the sliding area. Referring to FIG. 4, the blades 36 of the blade set 8 are secured to the elongated body 40 that is positioned below the sliding area of the frame 4 and proximal to the at least one aperture (corresponding slots 38) of the frame 4. In the shown embodiment, the elongated body 40 is a barrel. The retraction by tilting of the blade set 8 is performed according to the partial rotation of the barrel 40 with respect to the rotation axis when food material is pushed against the blade set 8 in the rearward displacement direction.

Referring to FIG. 7, the retraction mechanism of the tiltable blade assembly 10 further includes a shaft 42 that is received in the barrel 40 and that is mountable to the frame at both ends thereof. The retraction mechanism further includes a torsion spring 50 that connects the barrel 40 to the shaft 42. A first end of the torsion spring 50 can be secured to a distal end portion of the shaft 42 and a second end of the torsion spring 50 can be secured to a distal end position of the barrel 40. Various mechanisms can be used to allow partial rotation of the barrel 40 with respect to the shaft 42.

Figure 9:
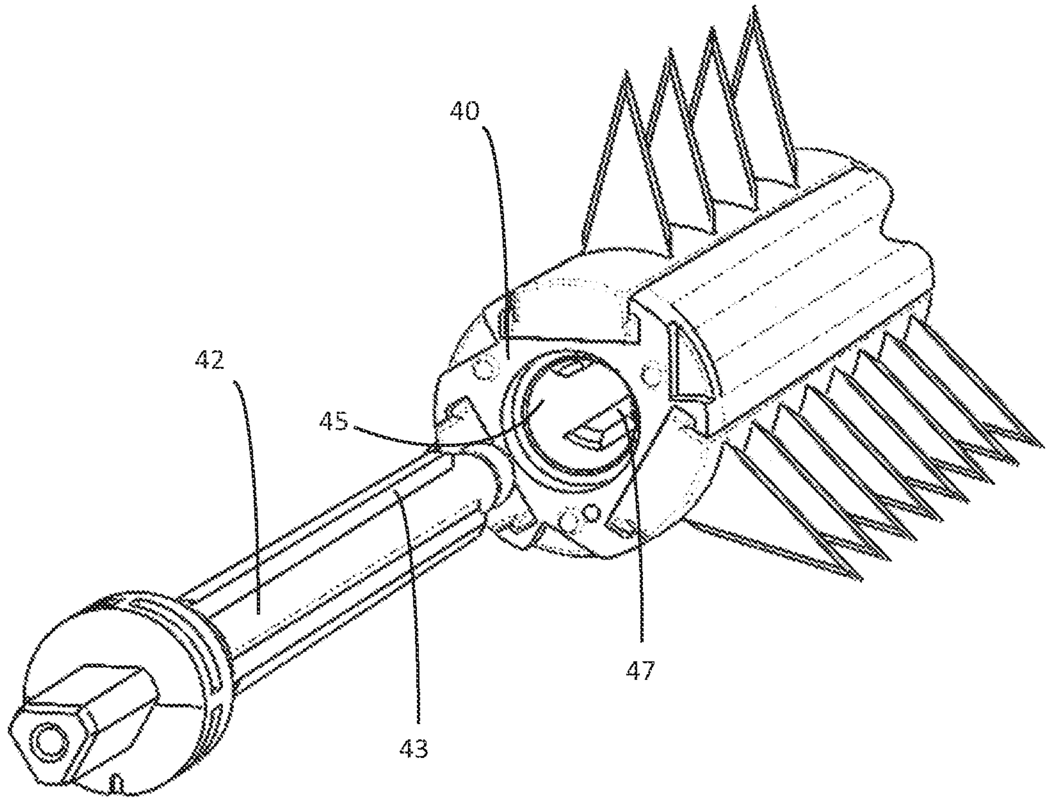
FIG. 9 is a top partially exploded elevational view of the tiltable blade assembly and associated retraction mechanism of the manual food slicing apparatus.

In the shown embodiment, referring to FIG. 9, a lip and groove connection is used to determine the range of the partial rotation of the barrel with respect to the shaft. More particularly, the shaft 42 can include at least one lip 43 extending along the shaft and protruding therefrom. The barrel 40 can further have at least one inner recessed cavity/groove 45 extending along the barrel 40 (i.e., in a transverse direction of the sliding area) and being defined generally below the blade set 8. The cavity 45 is sized and shaped to receive the lip 43 between ribs 47 including a front rib of the cavity 45 and a rear rib of the cavity 45, when the shaft 42 is in the barrel 40. The distance between front rib and rear rib thereof predetermines a range of the partial rotation of the barrel 40 about the rotation axis with respect to the shaft 42. In the cutting position of the blade assembly, the torsion spring maintains the rear rib of the cavity 45 of the barrel 40 in abutment with the lip 43 of the shaft 42. Upon exerting pressure on the rear edge of the blades, partial rearward rotation of the barrel 40 is actuated and the torsion spring becomes biased. The barrel 40 can rearwardly rotate with respect to the shaft 42 until the lip 43 abuts the front rib of the cavity 45, thereby allowing the blade set 8 to retract into the frame in the biased position (partial rearward rotation of the barrel). Releasing the pressure exerted onto the rear edge of the blades allows the torsion spring to spring back and actuate the forward rotation of the barrel 40 until the lip 43 abuts the rear edge of the cavity 45, thereby moving/tilting the blade set 8 back from the biased position into the cutting position (partial forward rotation of the barrel). The torsion spring is thus configured to allow the automatic return of the blade set from the biased position to the cutting by actuating the forward rotation of the barrel (and thus the blade set 8) with respect to the shaft 42 and about the rotation axis. The nature/flexibility of the torsion spring 50 predetermines the pressure needed to actuate the retraction of the blade set into the biased position and the speed at which the blade set is able to come back to the cutting position. As the lip 42 is abutted with the rear rib of the cavity 45 when the blade assembly is in cutting position, pressure against the front rib of the blade set does not cause any forward rotation of the barrel and the cutting position is maintained to allow the cutting operation.

In the shown embodiment, displacement of the food material can trigger the rearward tilting of the blade set 8 in the biased position via partial rotation of the barrel 40 when the food material is pressured against the rear edge of the blade set 8 in the rearward displacement direction. The torsion spring 50 is responsible for tilting the blade set 8 back from the biased position to the cutting position (forward tilting) as soon as contact pressure from the food material is released from the rear edge of the blade set 8. The food material can be further cut by the blade set 8 when the food material is moved along the sliding area in the forward displacement direction and abutting the front edge of the blade set 8, with the blade set 8 being blocked into the cutting position because the barrel 40 is not allowed to rotate further forward about the rotation axis.

Selective Locking of the Retractable Blade Assembly

The retractable blade assembly can also be selectively lockable for specific slicing operations. The locking of the retractable blade assembly can be performed by preventing actuation of the retraction mechanism. The locking of the retractable blade assembly refers to preventing the blades from retracting into the frame in response to the displacement of the food material, thereby allowing cutting the food material via the locked blade assembly when the food material is displaced from the distal portion of the sliding area to the proximal portion of the sliding area. The unlocking of the retractable blade assembly refers to allowing the blades to retract into the frame in response to the displacement of the food material, thereby leaving the food material untouched by the retracted blade assembly when the food material is displaced from the distal portion of the sliding area to the proximal portion of the sliding area.

For example, the manual food slicing apparatus can further include a locking mechanism that is operatively connected to the retraction mechanism. The locking mechanism can be actuated by a user of the apparatus to ensure the reversible locking of the retractable blade assembly. Advantageously, the retraction can thus be selectively deactivated to operate specific cutting operations, such as cubing. Deactivation of the retractability of the blade set can be performed by locking the blade set in place upon engagement of the retraction mechanism with the locking mechanism. The locking is reversible and retractability of the blade set can be reactivated by unlocking the blade set upon releasing the retraction mechanism from the locking mechanism.

In the shown embodiment, referring to FIG. 7, the locking mechanism can be a locking slider 44 that allows partial rotation of the barrel 40 with respect to the shaft 42 when the locking slider 44 is disengaged from the barrel 40, i.e., in an unlocked position. For example, the locking slider 44 can include a protruding pin 46 that is engageable into a corresponding/complementary recess 48 of the barrel 40 to lock the blade set in the cutting position by preventing the barrel 40 from being rotated when the blade set 8 is pushed by the food material in the rearward displacement direction.

Pusher

Figure 10:
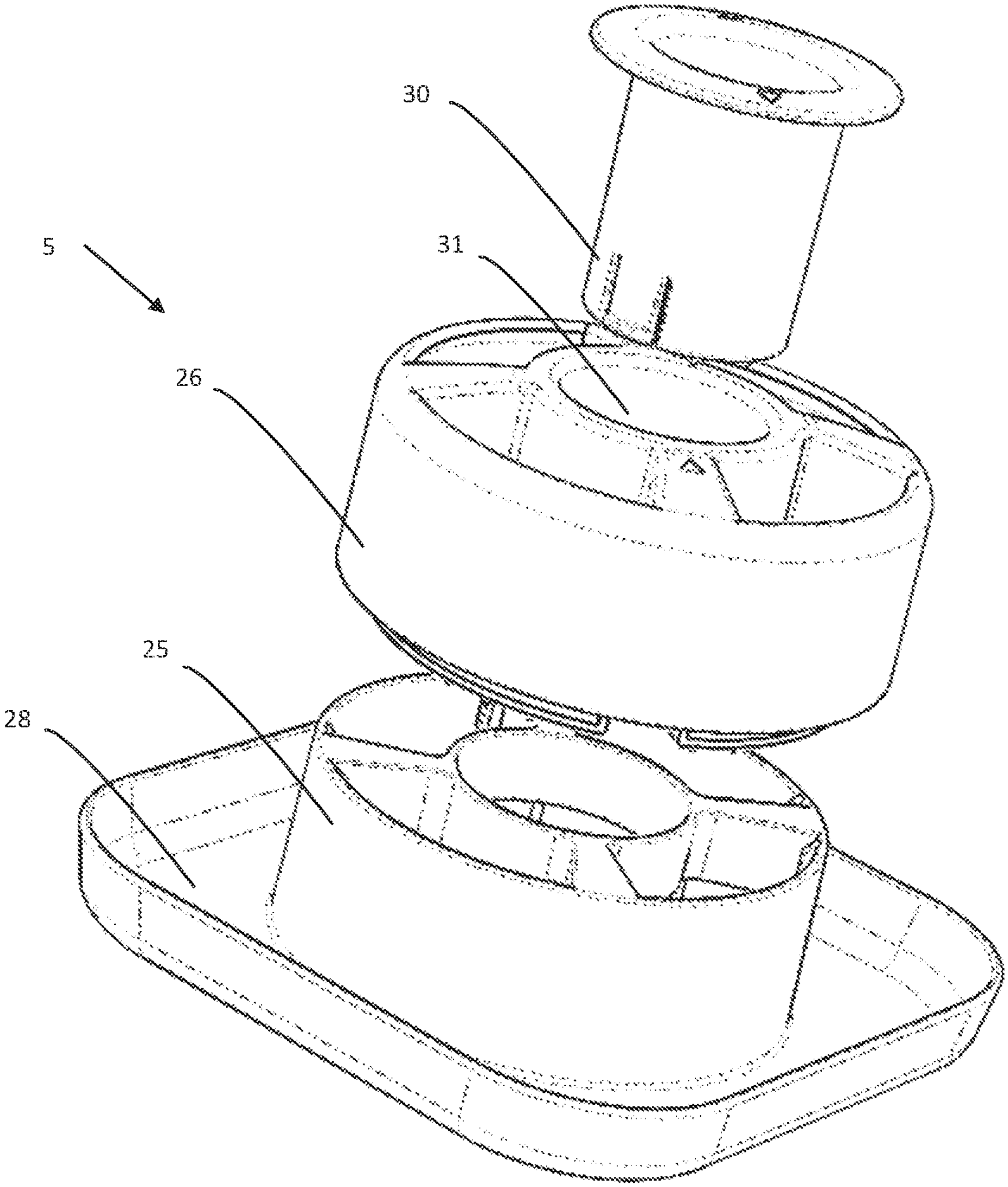
FIG. 10 is a top exploded elevational view of a pusher of the manual food slicing apparatus.
Figure 11:
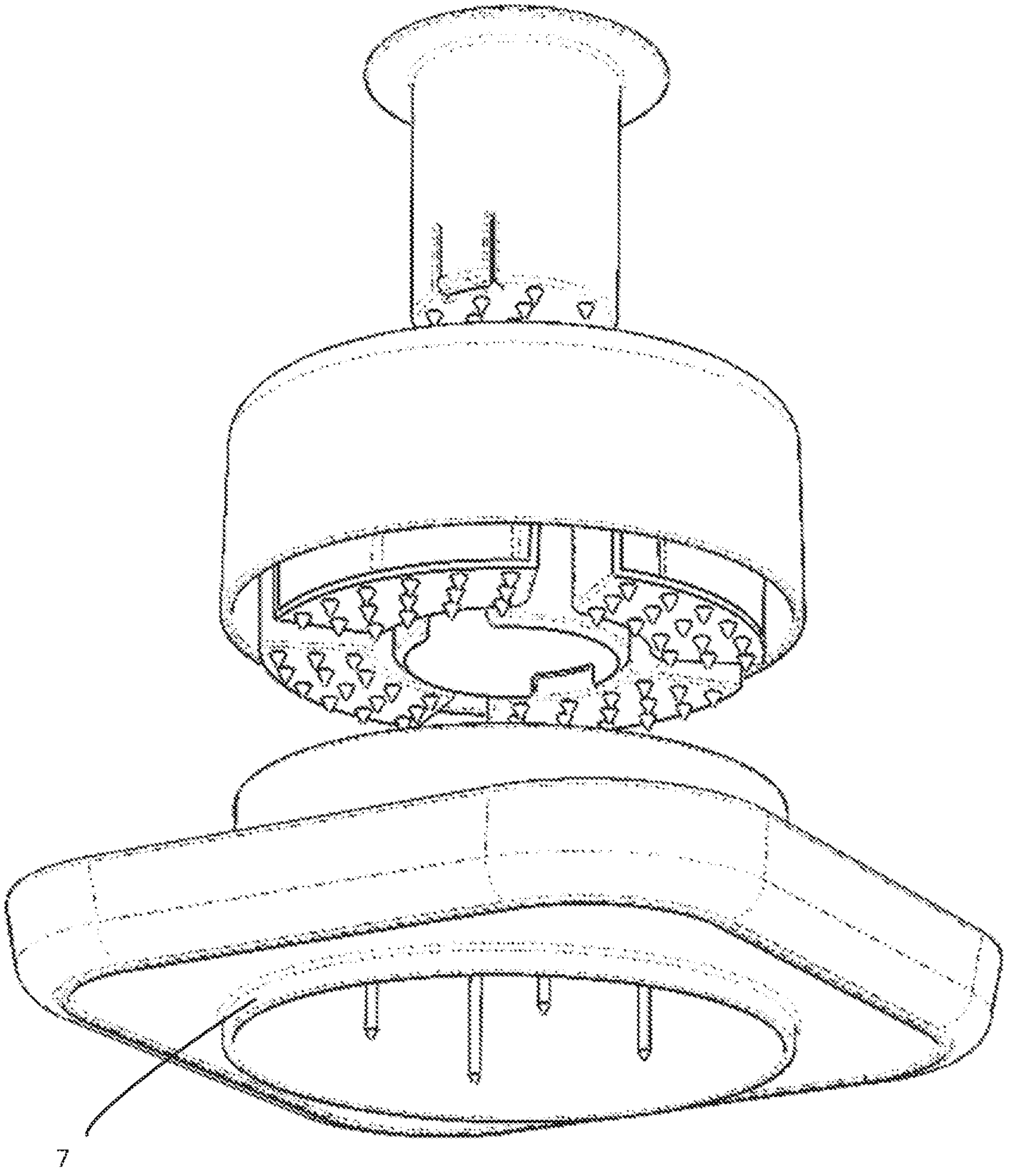
FIG. 11 is another top exploded elevational view of the pusher of the manual food slicing apparatus.

In the shown embodiment, referring to FIGS. 10 and 11, the pusher 5 can include a main body 25 and a hand guard 28 extending outwardly and further upwardly from a distal end of the main body to define a recess that can nest fingertips of the user for securing the slicing operations. The main body 25 can be at least partially hollow so as to define a cavity that is open at the distal end of the main body to secure the food material to be sliced within said cavity. The pusher 5 further includes a handle 26 having an ergonomic shape, such as a rounded or circular shape, to facilitate handling of the pusher 5 by the user. The handle 26 of the pusher can further move in a vertical direction with respect to the main body to exert pressure onto the food material while the size of the food material varies upon being sliced. In some implementations, as shown in FIG. 5, the handle 26 of the pusher 5 can define a channel 31, preferably central to the handle 26 and in food communication with the cavity of the main body. The pusher can include a secondary pusher 30 that is sized and shaped to be received within the channel of the handle 26 of the pusher 5. The secondary pusher 30 can be retrieved from the channel of the handle 26 and the channel can be used as a self-feeding opening where smaller food items can be inserted and gravity led towards the sliding area through the handle 26 and further through the main body, for being sliced upon moving the pusher 5. The channel can thus be referred to as a gravity-feeding opening. The secondary pusher 30 can be used to exert pressure on the smaller food item that is inserted in the channel of the handle 26, if necessary.

The pusher 5 is provided free with respect to the frame 4 and can be abutted to the frame 4 to sandwich the food material between the pusher 5 and the sliding area of the frame 4. In the shown embodiment, referring to FIG. 5, the frame 4 can include a pair of spaced apart edge walls 32 extending in parallel relation to the longitudinal displacement direction on each side of the sliding area 12. The hand guard 28 is sized to abut each edge wall above the sliding area 12. The hand guard 28 of the pusher 5 can have rounded edges to facilitate sliding of the pusher 5 against the frame 4 and along the sliding area 12.

Optionally, the edge walls of the frame can have a tapered surface to further guide the food material towards the sliding area between the edge walls of the frame.

Figure 3:
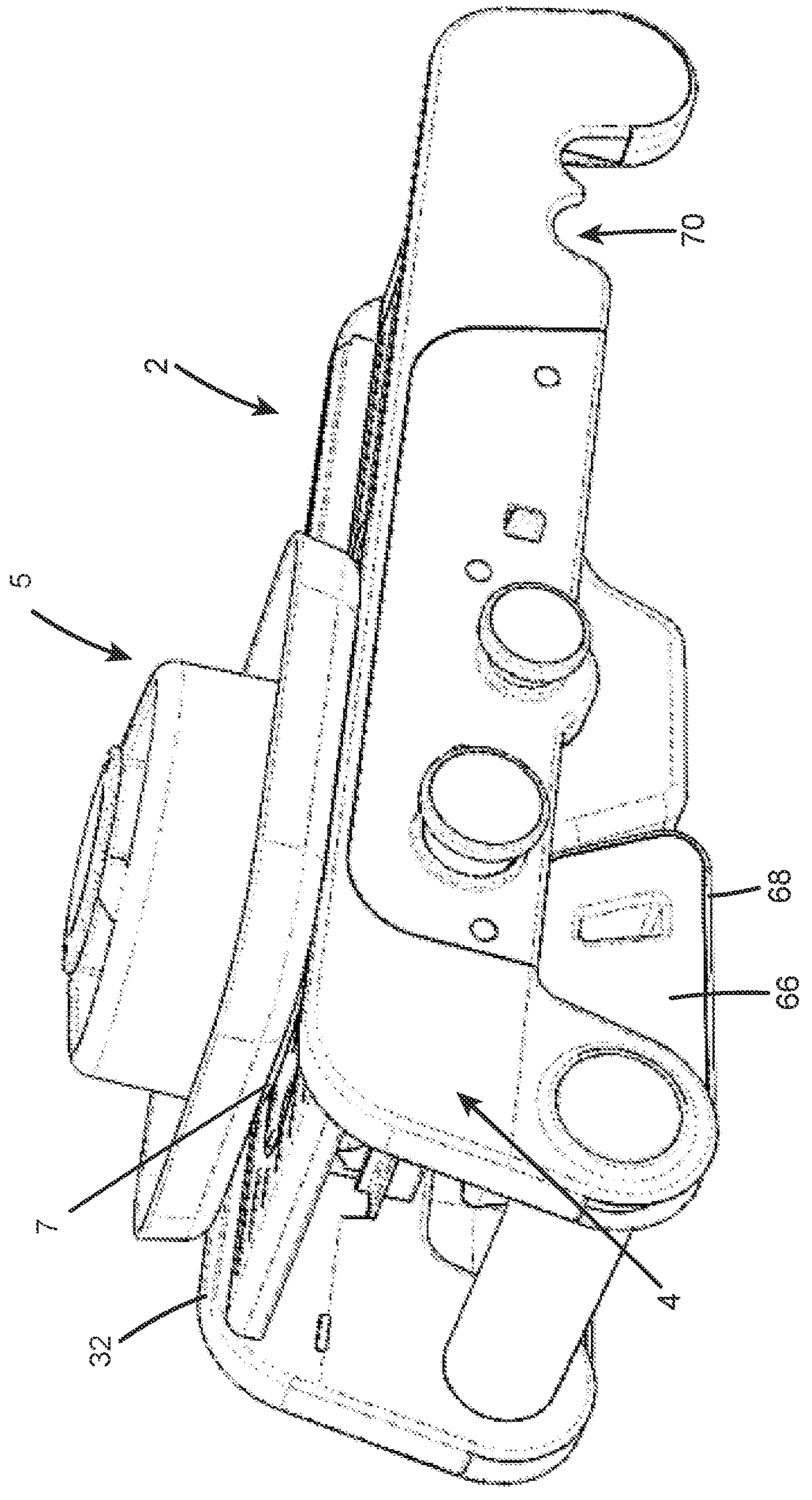
FIG. 3 is another top elevational view of the manual food slicing apparatus according to the embodiment of FIG. 1, showing the pusher being in contact with the slicing assembly and the leg component being in a closed position.

Optionally, as the pusher is provided free, referring to FIGS. 3 and 11, the pusher 5 can include a guiding member 7 to facilitate the alignment of the pusher 5 with the sliding area when being displaced along the longitudinal displacement direction. For example, the guiding member 7 can be a rounded rib such as a circular rib extending downwardly from a peripheral surface of the distal end of the main body of the pusher 5. The circular rib 7 is configured to slide against and along the edge walls 32 of the frame to maintain the pusher in the sliding area and maintaining the food material between the edge walls 32 of the frame.

It is noted that the guiding member, by having at least rounded corners or being circular, further facilitates the rotation of the pusher with respect to the sliding area without losing contact with the frame so as to perform specific cutting operations, such as cubing as will be further detailed in method implementations.

ADDITIONAL IMPLEMENTATIONS

In some embodiments, including the embodiment shown in the present Figures, the retractable blade assembly can include a plurality of blade sets, with the blade spacing of one blade set differing from the blade spacing of the other(s) blade set(s) so as to confer multiple julienne sizing options to the slicing apparatus. In the shown embodiment, referring to FIG. 7, three blade sets (8, 80, 82) are secured to the barrel 40 but it should be noted that multiple blade sets encompass two or more blade sets. Referring to FIGS. 4 and 5, the slicing apparatus 2 can include a cover 52 that is shaped to define a cavity and encase the multiple blade sets of the tiltable blade assembly 10 while allowing rotation the blade sets within the cover 52, thereby preventing the user from being cut during slicing operations. In the shown embodiment, referring to FIG. 7, the shaft 42 can be rotatable about the rotation axis to allow rotation the multiple blade sets (8, 80, 82) that are secured to the shaft 42 via the barrel 40. The barrel 40 includes a plurality of rib pairs 47 for receiving a corresponding lip of the multiple lips 43 of the shaft 42.

Thus, the sizing of the julienne slices can be modified by interchanging the blade sets 8 of different predetermined spacing that are attached to the barrel 40 upon rotating the barrel 40. Still referring to FIG. 7, the apparatus can include a blade selection knob 54 that is actuated to select one blade set among the plurality of available blade sets. Rotation of the shaft can be performed upon actuating rotation of the blade selection knob 54 that is operatively connected to the shaft, thereby causing rotation of the barrel 40 bearing the blades.

Referring to FIGS. 5 and 7, rotation of the blade selection knob 54 is allowed by pulling the knob 54 away from a control plate 56 of the frame 4 to translate the blade selection knob 54 with respect to the shaft 42, thereby causing compression of a spring 72 being located within the knob 54. As better seen in FIG. 5, the knob 54 includes a plurality of lips 58, for example six, that are disengaged from a plurality of corresponding grooves 60 being provided in the control plate 56, when the knob 54 is pulled away from the control plate 56. Upon disengaging the lips 58 from the grooves 60, the user can rotate the shaft 42, and thus the blade sets 8, by maintaining pulling while rotating the knob 54. Once a desired blade set 8 is selected and positioned through the sliding area 12, the shaft 42 can be prevented from being further rotated by releasing the knob 54 which moves automatically back towards the control plate 56 according to the detent of the spring 72 (not shown in FIG. 5). The return movement of the knob 54 causes the lips 58 to re-engage the corresponding grooves 60 and lock the knob 54 in place. It should be noted that the lips and grooves can be formed with sharp edges (and not rounded) to prevent accidental disengagement there between when the apparatus is moved or in use.

It should be noted that the blade selection knob can be locked in a position where no blade set 8 is put in use, so as to operate the apparatus only with the main blade 6.

It should be noted that, when the locking slider is in a locked position, exerting an excessive rotation of the tiltable blade assembly via the blade selection knob will lead to releasing the locking slider in an unlocked position to prevent any parts from breaking.

Referring to FIG. 5, it should be noted that the levelling assembly 20 of the sliding platform 34 can include a thickness selection knob 68 that is operated similarly to the blade selection knob 54. However, the lips 62 and grooves 64 of the thickness selection knob 68 can be more numerous and thus closer to one another than the lips 58 and grooves 60 of the blade selection knob 54 to provide a finer adjustment of the positioning of the sliding platform 34 (and thus thickness of the slices via the main blade 6). For example, increments as low as 1 mm can be used.

Figure 2:
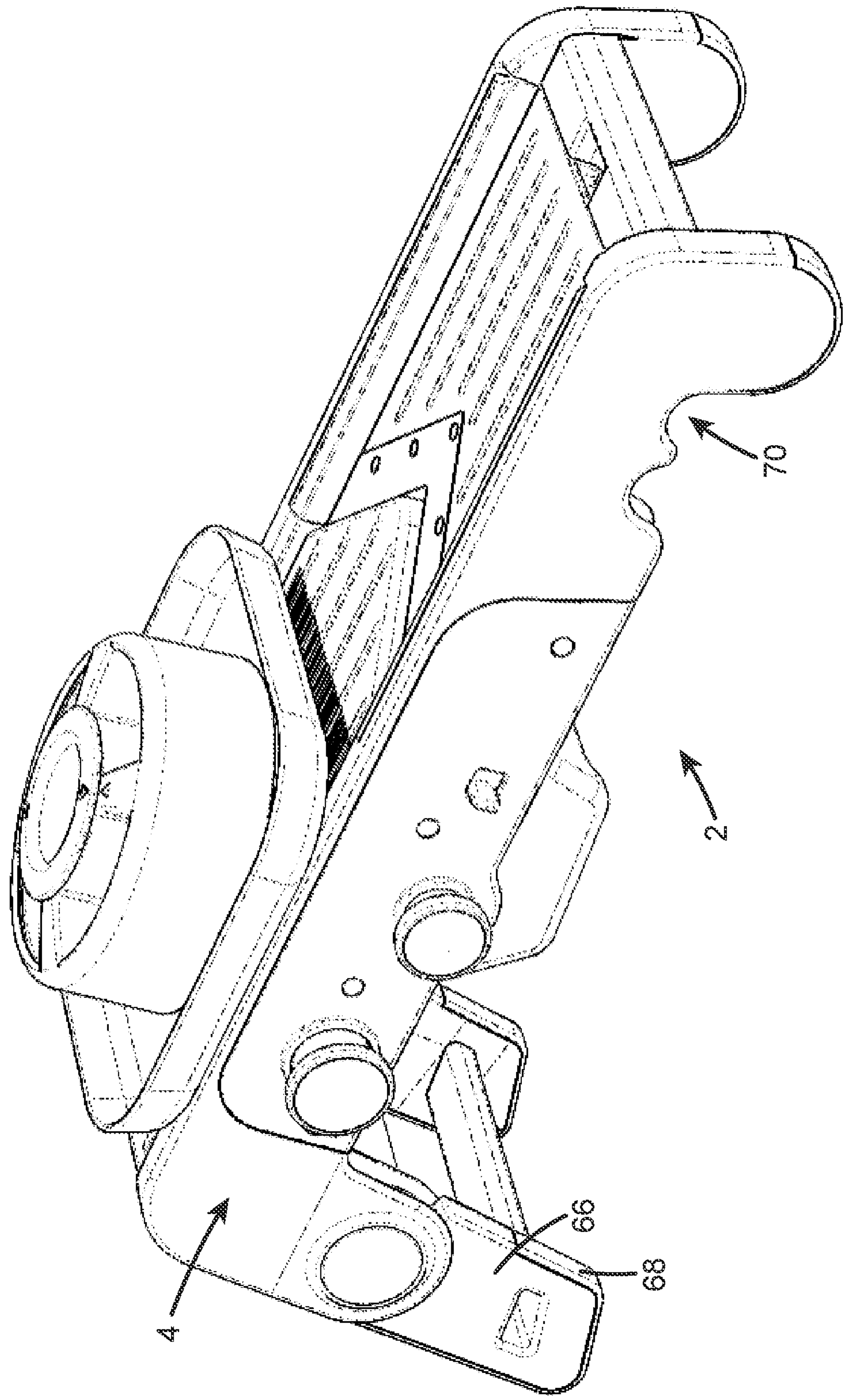
FIG. 2 is another top elevational view of the manual food slicing apparatus according to the embodiment of FIG. 1, showing the pusher being in contact with the slicing assembly and hiding a tiltable blade assembly of the slicing assembly.

Referring to FIGS. 2 and 3, positioning of the apparatus 2 during slicing operations can be facilitated by including a foldable leg component 66 that is pivotably connected to the frame 4. The leg component 66 can be deployed to put the frame 4 in an inclined position and allow creation of a space below the frame to accumulate the produced slices of food material. The apparatus 2 can be positioned on a counter space or on edges on a container, such as a bowl. A non-slip material 68 can be applied to a distal portion of the leg component 66, preferably on both side surfaces of the distal portion, to prevent the apparatus from sliding with respect to the counter space or container. Additionally, at least one recess 70, for example two recesses 70, can be defined in a distal portion of the frame 4 to engage an edge of the container with the leg component 66 being in a folded position, thereby allowing further securing of the apparatus 2 during slicing operations.

Because the frame can be inclined during slicing operations using the shown embodiment of the present slicing apparatus, it should be noted that upward/upwardly is used herein to refer to a direction from the distal portion of the sliding area to a proximal portion of the sliding area, and that downward/downwardly is used herein to refer to a direction from the proximal portion of the sliding area to a distal portion of the sliding area. However, rearward and forward could also be used to refer to the respective upward and downward directions without departing from the scope of the present invention.

Figure 8:
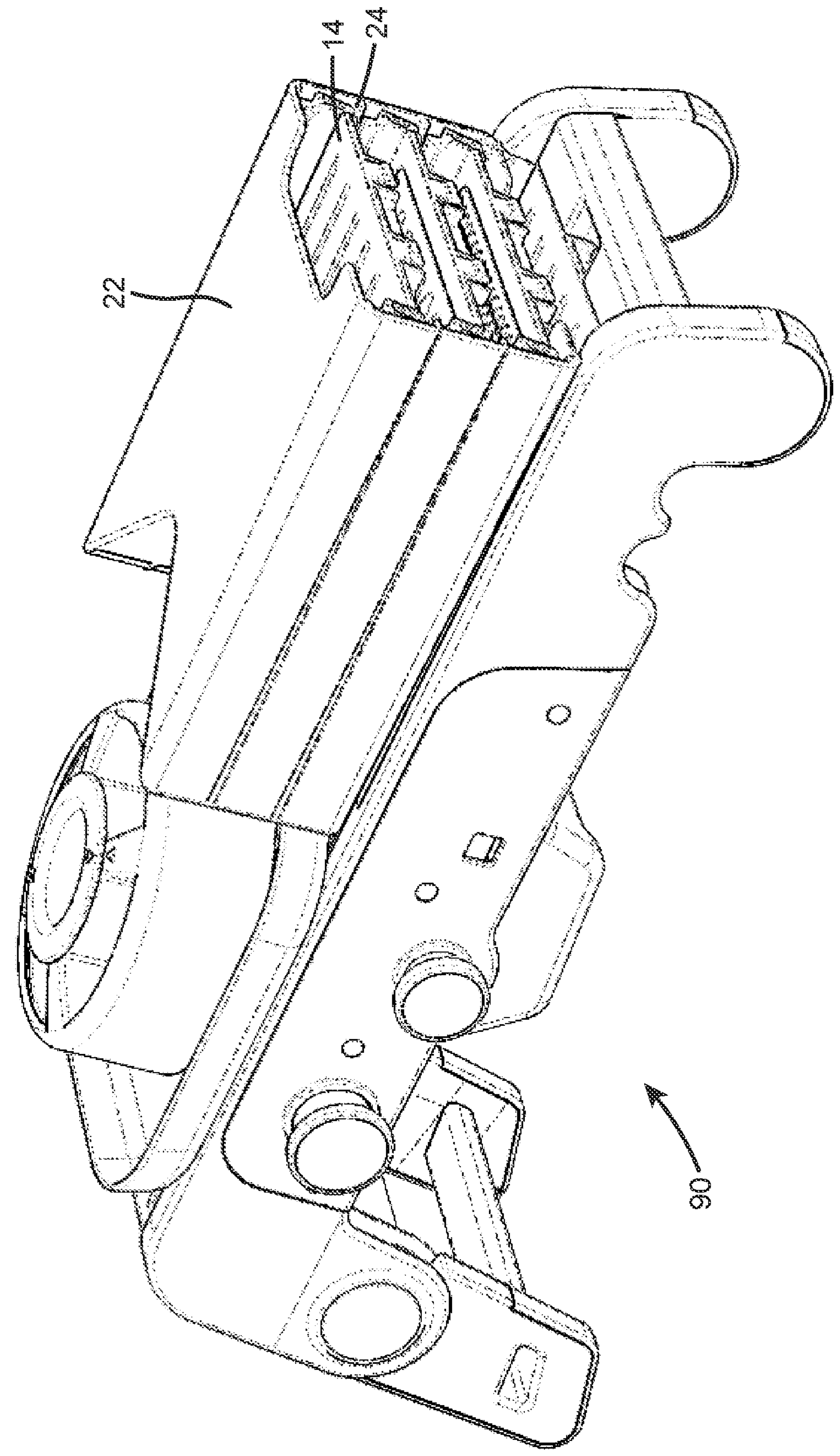
FIG. 8 is a top elevational view of the manual food slicing assembly including the apparatus according to the embodiment shown in FIG. 1 and a blade container that is securable to the frame of the apparatus.
Figure 12:
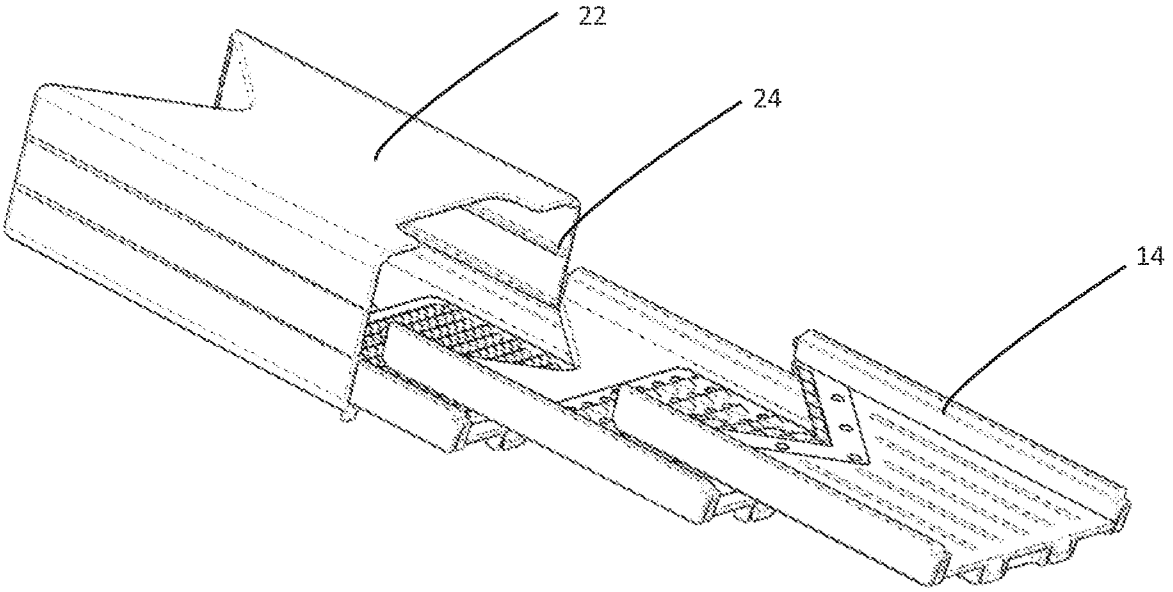
FIG. 12 is a top exploded elevational view of a blade container including multiples blade assemblies of the manual food slicing assembly.

In yet another general aspect, referring to FIG. 8, there is provided a food slicing apparatus assembly 90 comprising the apparatus 2 as described herein and a blade container 22 that is securable to the frame 4 of the apparatus 2. The blade container 22 can have two pairs of opposed walls defining a cavity having a rectangular cross-section to receive at least one main blade assembly 14 as described herein. Referring to FIGS. 8 and 12, for example, the blade container 22 can be sized and shaped to encase multiple main blade assemblies 14 by sliding each main blade assembly 14 along a corresponding pair of opposed rails 24 protruding from an inner surface of the walls of the blade container 22. A locking mechanism can be provided, such as an end-of-course snap-fit mechanism, to secure the blade in place in the container. Advantageously, the blade container 22 is further constructed to fit within the frame 4, for example within notches defined in the edge walls of the frame 4 above the distal portion 12*d* of the sliding area.

METHOD IMPLEMENTATIONS

In another general aspect, there is provided a method for slicing a food material with a manual slicing apparatus as described herein. The method can include at least one of a julienne slicing sequence and a cube slicing sequence. It is noted that slicing refers to any cutting operation that is performed by at least one of the main blade or blade assembly. In the present description, slicing thus includes, for example, cutting slices, grating, julienning and cubing of the food material.

The julienne slicing sequence comprises positioning the locking mechanism of the slicing apparatus in an unlocked position, and displacing the food material from the proximal portion of the sliding area along the sliding area in a downward direction against a front edge of the julienne blade set to perform longitudinal cuts in the food material, and further against the mandoline blade to perform a cross-sectional cut in the food material, thereby producing food material slices in a julienne fashion. An unsliced portion of the food material that remains between the pusher and the frame can be further displaced from the distal portion of the frame along the sliding area in the upward displacement direction towards the proximal portion of the sliding area, wherein, while being displaced, pressure of the food material or pusher against the actuator component (e.g. rear edge of the julienne blade set) triggers tilting of the julienne blade set back into the frame to prevent any cut into the moving food material.

The cube slicing sequence comprises positioning the locking mechanism of the slicing apparatus in a locked position to prevent the julienne blade set from tilting, and displacing the food material from the distal portion of the sliding area in an upward displacement direction along the sliding area and against the rear edge of the julienne blade set to perform longitudinal cuts in the food material. As the julienne blade set is prevented from tilting back into the frame by the locking mechanism, pressure of the food material against the rear edge of the blade allows performing a first set of longitudinal cuts in the upward displacement direction during the cube slicing sequence. The cube slicing sequence further includes rotating the food material at a 90° angle on the proximal portion of the sliding area, and displacing the food material from the proximal portion of the sliding area in the downward displacement direction along the sliding area against the front edge of the blade set to perform a second set of longitudinal cuts in the food material and further against the main blade to perform a cross-sectional cut in the food material, thereby producing food material cubes.

The method can further include repeating at least one of the julienne slicing sequence, and the cube slicing sequence.

It is noted that the cube slicing sequence can further include rotating the remaining unsliced food material at a 90° angle at the distal portion of the sliding area. When repeating the cube slicing sequence, this final rotating step allows the first set of longitudinal cuts of a subsequent sequence to the performed in the same direction as the first set of longitudinal cuts of the former sequence, thereby facilitating handling of the pusher by returning the hand of the user to its initial position.

In some implementations, the at least one of the julienne slicing sequence and the cube slicing sequence can further include actuating the blade selection knob of the apparatus to allow another julienne blade set from the julienne blade assembly (having a different spacing between the julienne blades) to be in operation through the frame. For example, the blade set could be interchanged between two consecutive julienne slicing sequences or cube slicing sequences.

In some implementations, the at least one of the julienne slicing sequence and the cube slicing sequence can further include actuating the thickness adjustment knob to adjust a distance between the frame and the stationary main blade, thereby varying a thickness of the slices produced by the main blade. Optionally, the distance between the frame (for example, via the levelling of the sliding platform) and the main blade can be adjusted between 1 mm and 10 mm, thereby producing slices of a corresponding thickness. For example, the distance between the frame and the main blade can be adjusted between two consecutive julienne slicing sequences or cube slicing sequences. For example, the distance between the frame and the main blade can be adjusted between a julienne slicing sequence and a cube slicing sequence.

In some implementations, the method can include rotating the blade selection knob to lower the tiltable blade set below the frame and producing slices of food material by displacing the food material in a downward displacement direction along the sliding area and against the main blade. For example, by tailoring the distance between the sliding platform and the main blade to a lower thickness and by using a crinkled V-shaped main blade, waffle-style slices can be produced upon rotating the pusher according to a 90° angle between each downward pass.

It should be noted that the same numerical references refer to similar elements. Furthermore, for the sake of simplicity and clarity, namely so as to not unduly burden the figures with several references numbers, not all figures contain references to all the components and features, and references to some components and features may be found in only one figure, and components and features of the present disclosure which are illustrated in other figures can be easily inferred therefrom. The embodiments, geometrical configurations, materials mentioned and/or dimensions shown in the figures are optional, and are given for exemplification purposes only. Therefore, the descriptions, examples, methods and materials presented in the claims and the specification are not to be construed as limiting but rather as illustrative only.

It is worth mentioning that throughout the following description when the article "a" is used to introduce an element it does not have the meaning of "only one" it rather means of "one or more". For instance, the unit according to the invention can be provided with one or more reaction and/or separation chamber, one or more confining openwork structure, etc. without departing from the scope of the present invention. It is to be understood that where the specification states that a component, feature, structure, or characteristic "may", "might", "can" or "could" be included, that particular component, feature, structure, or characteristic is not required to be included.

Although the embodiments of the slicing apparatus and corresponding parts thereof consist of certain geometrical configurations as explained and illustrated herein, not all of these components and geometries are essential and thus should not be taken in their restrictive sense. It is to be understood, as also apparent to a person skilled in the art, that other suitable components and cooperation thereinbetween, as well as other suitable geometrical configurations, may be used for the slicing apparatus, as briefly explained herein and as can be easily inferred herefrom by a person skilled in the art. Moreover, it will be appreciated that positional descriptions such as "above", "below", "rearward", "forward", "upward", "downward" and the like should, unless otherwise indicated, be taken in the context of the figures and should not be considered limiting.

In the above description, an embodiment is an example or implementation of the inventions. The various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention may also be implemented in a single embodiment.

The invention claimed is:

1. A manual food slicing apparatus for slicing a food material and produce food cuts, the apparatus comprising:

a frame defining a sliding area having at least one aperture, the sliding area being configured for receiving the food material when abutted to and pressured against the sliding area;

a main blade being mounted about the frame and extending in parallel relation to the sliding area to slice the food material being displaced in a forward displacement direction along the sliding area;

a blade assembly being mounted about the frame and positioned upstream of the main blade in a longitudinal direction of the sliding area, the blade assembly comprising a blade set comprising multiple spaced apart blades being positioned in a row that extends in a transverse direction of the sliding area;

a retraction mechanism being operatively connected to the blade assembly and being actuable to cause movement of the blade assembly in response to the displacement of the food material in a rearward displacement direction, wherein the blade assembly is moveable between:

a cutting position wherein the blade set extends upwardly from the sliding area and through the at least one aperture of the frame to perform longitudinal cuts in the food material upon sliding the food material against the blade set in the forward displacement direction of the sliding area, and a biased position when the blade set is retracted below the sliding area and through the at least one aperture to avoid cutting the food material upon sliding the food material in the rearward displacement direction of the sliding area; and a locking mechanism being operatively connected to the retraction mechanism, wherein the locking mechanism is selectively moveable between:

a locked position where the locking mechanism prevents actuation of the retraction mechanism, thereby preventing movement of the blade assembly from the cutting position to the biased position, and an unlocked position where the locking mechanism allows actuation of the retraction mechanism, thereby allowing movement of the blade assembly between the cutting position and the biased position;

wherein the blade assembly is configured to automatically move back from the biased position to the cutting position when the retraction mechanism is released.

2. The apparatus of claim 1, wherein the retraction mechanism comprises a spring, and the blade assembly is configured to move back from the biased position to the cutting position under the action of the spring.

3. The apparatus of claim 1, wherein the retraction mechanism is configured to force the retraction of the blade set below the sliding area by tilting the blade set about a rotation axis being parallel to the transverse direction of the sliding area between the cutting position and the biased position.

4. The apparatus of claim 1, wherein the retraction mechanism further includes a barrel onto which are secured the blades of the blade set, and a shaft that is inserted through the barrel and that is mounted at each end thereof to the frame, with the barrel being partially rotatable with respect to the shaft to allow the blades to tilt between the cutting position and the biased position.

5. The apparatus of claim 1, wherein the blade set is a first blade set and the blade assembly comprises a plurality of blade sets having different blade spacing, and wherein the blade assembly further comprises a blade selection knob that is actuable to position one blade set of the plurality of blade sets into the cutting position.

6. The apparatus of claim 1, wherein the frame comprises a sliding platform and a levelling assembly, with the levelling assembly being actuable to vary a distance between the sliding platform and the main blade of the apparatus, thereby varying a thickness of the food cuts.

7. The apparatus of claim 1, further comprising a main blade assembly, the main blade assembly comprising the main blade and a secondary frame to which is mounted the main blade, wherein the secondary frame is positioned at a certain height with respect to the frame so as to define a gap between the main blade and the frame.

8. The apparatus of claim 1, wherein the frame comprises a pair of spaced apart edge walls extending upwardly from the frame and in parallel relation to the longitudinal displacement direction on each side of the sliding area.

9. The apparatus of claim 8, further comprising a free pusher that is configured to cooperate with the frame for maintaining the food material abutted to and pressured against the sliding area when displaced along the sliding area, the pusher comprising:

a main body including an open cavity that is sized and shaped to contain the food material during slicing thereof; and a circular rib extending downwardly from a peripheral surface of the distal end of the main body, the circular rib being configured to slide along the edge walls of the frame to maintain the pusher in the sliding area and to allow rotation of the pusher with respect to the frame.

10. The apparatus of claim 9, wherein the pusher further includes a hand guard extending outwardly and further upwardly from the distal end of the main body to define a recess for nesting fingertips of a user.

11. The apparatus of claim 1, comprising an actuator component that is positioned along the sliding area and that is operatively connected to the retraction mechanism, in order to actuate the retraction mechanism and allow movement of the blades between the cutting position and the biased position when the actuator component is triggered by the displacement of the food material along the sliding area.

12. The apparatus of claim 11, wherein the actuator component is a lever or a button positioned on the frame along the sliding area.

13. The apparatus of claim 11, wherein the actuator component comprises or consists of the blade set.

14. A food slicing apparatus assembly comprising the apparatus as defined in claim 1, and a blade container that is securable to the frame of the apparatus.

15. A manual food slicing apparatus for slicing a food material and produce food cuts, the apparatus comprising:

a frame defining a sliding area having at least one aperture, the sliding area being configured for receiving the food material when abutted to and pressured against the sliding area;

a main blade being mounted about the frame and extending in parallel relation to the sliding area to slice the food material being displaced along the sliding area;

a blade assembly being mounted about the frame and positioned upstream of the main blade in a longitudinal direction of the sliding area, the blade assembly comprising a blade set comprising multiple spaced apart blades being positioned in a row that extends in a transverse direction of the sliding area; and a retraction mechanism being operatively connected to the blade assembly and being actuable to cause tilting of the blade assembly in response to the displacement of the food material in a rearward displacement direction, wherein the blade assembly is tiltable between:

a cutting position wherein the blade set extends upwardly from the sliding area and through the at least one aperture of the frame to perform longitudinal cuts in the food material upon sliding the food material against the blade set in a forward displacement direction of the sliding area, and a biased position when the blade set is tilted below the sliding area and through the at least one aperture to avoid cutting the food material upon sliding the food material towards the blade set in the rearward displacement direction of the sliding area;

wherein the blade assembly is configured to automatically tilt back from the biased position to the cutting position when the retraction mechanism is released.

16. The apparatus of claim 15, further comprising a locking mechanism being operatively connected to the retraction mechanism, wherein the locking mechanism is selectively moveable between:

a locked position where the locking mechanism prevents actuation of the retraction mechanism, thereby preventing tilting of the blade assembly from the cutting position to the biased position, and an unlocked position where the locking mechanism allows actuation of the retraction mechanism, thereby allowing tilting of the blade assembly between the cutting position and the biased position.

17. A method for slicing a food material using the apparatus as defined in claim 1, the method comprising performing at least one of:

a julienne slicing sequence comprising the steps of:

positioning the locking mechanism in the unlocked position, displacing the food material in the forward displacement direction from the proximal portion of the sliding area to the distal portion of the sliding area to perform longitudinal cuts in the food material upon passing the blade assembly in the cutting position and to further perform a cross-sectional cut in the food material upon passing the main blade, thereby producing the food cuts in a julienne fashion and a remaining unsliced food material, and displacing the remaining unsliced food material in the rearward displacement direction from the distal portion of the sliding area to the proximal portion of the sliding area to retract the blade set into the frame from the cutting position into the biased position in response to the displacement of the food material, thereby preventing any cut into the remaining unsliced food material; and a cube slicing sequence comprising the steps of:

positioning the locking mechanism in the locked position to prevent the blade assembly to move from the cutting position into the biased position, displacing the food material in the rearward displacement direction from the distal portion of the sliding area to the proximal portion of the sliding area to perform a first set of longitudinal cuts in the food material upon passing the blade assembly in the cutting position and produce a partially cut food material, when at the proximal portion of the sliding area, rotating the partially cut food material at a 90° angle to position the first set of longitudinal cuts in a transverse direction of the sliding area, displacing the partially cut food material in the forward displacement direction from the proximal portion of the sliding area to the distal portion of the sliding area to perform a second set of longitudinal cuts in the partially cut food material upon passing the blade assembly in the cutting position and to further perform a cross-sectional cut in the partially cut food material upon passing the main blade, thereby producing food material cubes and the remaining unsliced food material.

18. The method of claim 17, wherein the cube slicing sequence further comprising rotating the remaining unsliced food material at a 90° angle at the distal portion of the sliding area.

19. The method of claim 17, comprising repeating at least one of the julienne slicing sequence, and the cube slicing sequence.

20. The method of claim 17, comprising using the pusher to secure the food material when displacing and/or rotating the food material along the sliding area.

* * * * *